UNITED STATES PATENT OFFICE.

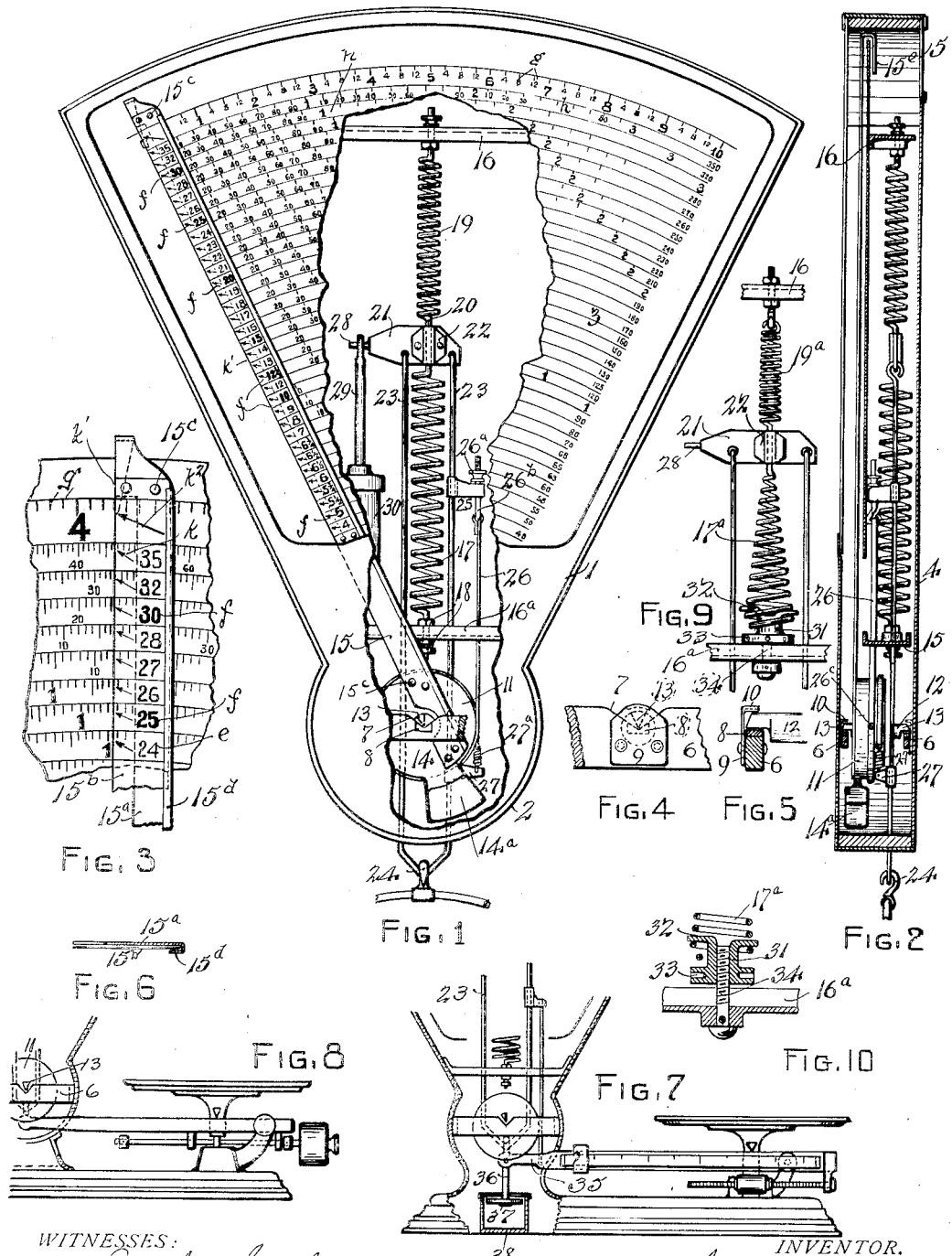
H. S. HALLWOOD.
COMPUTING SCALE.
APPLICATION FILED JULY 25, 1910.
1,195,213.
Patented Aug. 22, 1916.

HENRY S. HALLWOOD, OF COLUMBUS, OHIO, ASSIGNOR TO ANNIE HALLWOOD, OF COLUMBUS, OHIO.

COMPUTING-SCALE.

1,195,213.

Specification of Letters Patent. Patented Aug. 22, 1916.

Application filed July 25, 1910. Serial No. 573,805.

*To all whom it may concern:*

Be it known that I, HENRY S. HALLWOOD, a citizen of the United States, residing at Columbus, in the county of Franklin and State of Ohio, have invented a certain new and useful Improvement in Computing-Scales, of which the following is a full, clear, and exact description, reference being had to the accompanying drawings.

This invention relates to computing scales of the "spring balance" type, and has in view the following objects:—First: To provide an improved construction of index or indicator whereby the reading of the computations may be made quickly and accurately. Second: To provide an improved chart for computing scales which will greatly facilitate the reading and lessen the time required for ascertaining the computations, certain features of the index or indicator coöperating with the chart construction referred to. Third: To neutralize, in a spring-balance scale, the variations in tension of the spring which exist in all coiled springs in consequence of temperature changes. This susceptibility to temperature changes has been recognized, not only by scale manufacturers, but by the public generally. Manufacturers have attempted to provide means for compensating for the variations in tension produced by temperature changes, but, so far as I am advised, these attempts have not produced satisfactory results. Furthermore, recognition of the defects in spring-balance scales have so appealed to the public that, in some States, spring-balance scales are prohibited by law.

I accomplish the objects stated hereinbefore by the construction and arrangements of parts shown in the drawings forming part hereof, wherein—

Figure 1 represents a front elevation, with parts broken away, of the major portion of a scale constructed in accordance with my invention; Fig. 2 represents a vertical sectional view taken through the scale shown in Fig. 1; Fig. 3 represents an enlarged detail of the chart and index or indicating member; Figs. 4 and 5 are details of the knife edge bearings for the disk or drum which carries the index; Fig. 6 is a sectional detail of the upper end of the index shown in Figs. 1 and 3; Fig. 7 is a detail, partly in section and partly in elevation, of the lower part of another form of scale constructed in accordance with my invention; Fig. 8 is a similar form of a still further modified view of my invention; Fig. 9 represents a detail in elevation of a preferred form of the springs shown in the preceding figures; and Fig. 10 a sectional detail of the lower spring support.

Describing the parts by reference numerals, 1 denotes the casing generally, within which the chart, drum, springs, movable index, and dash pot are located. This casing is generally segmental in outline, the lower end being enlarged or rounded, as shown at 2, to provide a space suitable for the revolution of the drum or disk which carries the indicator. For convenience of description, that side of the casing which faces the operator will be called the "front" and the opposite portion will be called the "rear." The front of the casing is covered with glass or other transparent material, being closed only at the lower portion, whereby the chart 3 and the numeral carrying portion of the index are exposed to view of the operator.

The rear of the casing, with the exception of the upper end, is closed by a plate 4, the upper end being provided with an arcuate slot covered by transparent material 5 through which the customer may read the weight numerals and graduations upon the part of the chart exposed to his view. The front and rear walls of the casing are provided with opposed bearings for the knife-edge pivots of the drum or disk. These bearings may be conveniently formed by means of straps 6, each having a stepped recess 7 in the upper edge thereof. Within the lower steps or portions of such recesses are forced the bearings 8. These bearings are preferably of steel or agate and are firmly retained in place in the lower portion of the recesses 7, as by cement. Each strap is provided with a retaining plate 9 secured to the outer face thereof in line with the central portion of the recess 7. The upper end of this plate is bent inwardly above the bearing 8, as shown at 10, to retain the knife-edged pivots of the index disk or drum in place.

11 denotes the drum or disk referred to hereinbefore. This drum or disk is provided with a shaft 12, the opposite ends of which are formed into knife-edged pivots 13, said pivots being adapted to rest upon the bearings 8 and being overhung by the inwardly projecting ends 10 of the retaining plates. The front end of the drum 11 is provided with a head 14 to which is secured, as by means of rivets, the index 15. Projecting from the drum 11 and substantially diametrically opposite the index 15 is a counterbalancing projection 14$^a$, which tends to balance or counterpoise the drum and the aforesaid index or indicator.

The index 15 is preferably constructed in substantially the same manner as shown in my application #323,553, filed June 27, 1906, and comprises generally a metallic and opaque base 15$^a$ which supports a transparent member 15$^b$, said member overhanging the left-hand edge of the base and permitting, through such overhanging portion, the inspection and reading of the chart 3 therebehind. The transparent member 15$^b$ is conveniently secured to the base member 15$^a$ by means of rivets 15$^c$ and a bead 15$^d$ formed at the right-hand edge of the base. The opaque side of the index is preferably white in color and is provided with numerals $e$ and $f$ thereon. The index is provided with arcs coinciding with the arcs appearing on the chart and the numerals $e$ and $f$ are placed upon the arcs on the index. These numerals indicate the rate per pound (or other unit weight) of the commodities weighed. The topmost arc $g$ of the chart indicates the weight of the commodities placed on the scale, while the figures in each arcuate space $h$ on the chart indicate the values of the commodities at the rates which are represented by the numerals $e$ and $f$ on the index.

For the purpose of facilitating the reading of the prices of the commodities weighed, I provide each concentric space of the index with a leader or index line, preferably an arrow $k$, extending diagonally upwardly from right to left and pointing to the particular graduations on the chart to which the numerals $e$ and $f$ correspond. This is of great importance in quickening the reading of the price and in enhancing the accuracy of such reading. The operator is liable to read the numeral representing the price per pound in conjunction with the price graduations corresponding to the next price numeral below, or toward the pivotal center of the index, with the result that the value of the commodity sold will not correspond with the price per pound thereof. By the arrangement described, the eye of the operator is directed from the proper numeral to the value or reading line $k'$ provided at the left hand edge of the transparent member, and it is not only well nigh impossible for him to make this mistake, but the quickness of reading is greatly facilitated. The upper arrow $k^2$ is provided for the purpose of directing the eye of the operator to the graduations $g$ denoting the weight of the article. The reading line $k'$ is prominently printed near the edge of the index, the color being preferably red or black.

It will be noted that the numerals $f$ are heavier than the numerals $e$, making the former numerals more prominent than the latter. The numerals $f$ will be appropriated to prices per pound that are most in use, as for instance, 5, 10, 12½, 15, 20, 25, 30, thus enabling the user to more readily select and distinguish the numerals in most frequent use from those in less frequent use.

The upper end of the metallic part or base of the index is bent over the top of the chart and projects downwardly, as shown at 15$^e$ to form a pointer with the weight graduations provided on the rear face of the chart.

For the purpose of preventing variations in temperature from affecting the tension of the spring or springs employed in my scale, I provide a pair of coiled springs of equal lengths of wire and so connect these springs with the scale pan or scale beam that the contraction of one will act in opposition to the contraction of the other and in such manner that when used for weighing and computing, the compression of one will always be equal in resistance and value to the expansion of the other without regard to the lowering of the temperature, it being understood that the springs are always adjusted to zero position at a temperature of about 110° F. so that when placed in use there will always exist varying degrees of uniform contraction in opposite directions, thereby harmoniously holding the indicator at its proper zero position.

16 and 16$^a$ denote, respectively, an upper and a lower cross bar carried by the casing. To the lower cross bar the lower end of a coiled spring 17 is adjustably secured (see Fig. 1) said end being shown as projecting through the cross bar and being threaded and being provided above and below the cross bar with adjusting nuts 18, whereby said spring may be adjusted to allow the indicator to point to zero when no weight is on the scale pan. To the cross bar 16, the upper end of a helical spring 19 is adjustably secured in the same manner as the end of the spring 17 is secured to the cross bar 16$^a$. The springs 17 and 19 are rigidly attached to a member 21 through which the springs are connected to the scale pan and to a dash pot or air cylinder to minimize the vibrations of the springs. The connecting member shown herein comprises a plate 21 extending transversely of the wire 20 and secured thereto by a suitable clip 22. A pair of rods 23 are rigidly connected to the plate 21 and project through and are guided by the cross bar 16$^a$. In the form of scale shown in Figs. 1 and 2, the lower ends of these rods are brought together and receive the hook 24 by which a scale pan (not shown) may be supported. One of the rods 23 is provided with a projection 25 to which is adjustably secured the upper end of a flexible band 26, said band extending around the drum 11 and having its end secured to a second projection 27 secured to the rod 23 below said drum and having its inturned portion secured to the drum by a screw 26ᶜ. One end of the plate 21 is provided with a projection 28 which is connected to a piston rod 29 extending into a dashpot or air cylinder 30.

By the construction described, the operation will be clear. Any weight applied to the connecting member 21 will compress the spring 17 while expanding the spring 19. Thus each spring for weighing purposes acts harmoniously with the other, but on changes of temperature below 110° F., each acts in opposition to equalize the other, and this secures a thermometrical balance which will prevent the shifting of the index hand with reference to the zero point through temperature changes. It will be evident that, as the rods 23 are pulled downward by a weight in the scale pan, the band 26 will rotate the drum and with it the index. When the weight is removed from the scale pan, the spring 17 expands and the spring 19 contracts, thereby causing the index to return to zero. To prevent a heavy weight suddenly thrown in the scale pan from damaging the band 26, I interpose a spring 27ᵃ between the lug or projection 27 and the end of the band 26.

In Fig. 9 there is shown a preferred form of the spring arrangement shown in the preceding figures. The lower spring member 17ᵃ is in spiral form, but is connected to the upper member 19ᵃ in like manner as before. The adjustment of the spring 17ᵃ is secured by means of a rotatable support 31 having prongs or projections 32 adapted to extend between the convolutions of the spring. The support 31 is provided with apertures 33 for the reception of a suitable pin. The support is threaded on a stud 34 extending through the cross bar 16ᵃ, the stud having a thread the pitch of which is the same as that of the spring. When the support is revolved, it moves up or down in the convolutions of the spring, varying the length and capacity of the spring in accordance with the weight on the pan and the graduations without affecting its tension. For instance, if a 5 lb. sealer's weight be placed on the pan, by moving the support up or down the index hand reading line may be brought precisely to 5 lbs. on the chart.

In Fig. 7 the arrangement is the same as shown in Figs. 1 and 2 with the exception that the lower ends of the rods 23 are connected with the end of a scale beam 35 of a platform scale and the end of said scale beam is connected with a piston rod 36 having at its lower end a piston 37 within a dash pot cylinder 38.

In Fig. 8, a form of scale beam connection is shown which is similar to that illustrated in Fig. 6, but the dash pot is omitted from the latter figure. The type of scale, however, is a platform scale and is generally the same as that shown in Fig. 7.

Reference has been made to the adjustable connection between the upper end of the band 26 and the projection 25. This is an important feature of my construction, as it enables the assembler to make his final adjustment very easily and quickly. The spring 27ᵃ will be under sufficient tension, when first assembled, to bring the indicator several ounces above zero. By operating the adjusting nut 26ᵃ on the top of the rod 26ᵇ which supports the upper end of the band or tape 26, the indicator may be brought back to correct position and the spring 27ᵃ still have sufficient tension to carry the indicator band forward when a weight is placed or thrown suddenly on the pan. This spring also serves the function, hereinbefore described, of cushioning against blows from heavy articles which may be thrown suddenly or violently on the scale pan and preventing the stretching or breaking of the band or tape 26.

Having thus described my invention, what I claim is:

1. In a computing scale, the combination, with a chart having a plurality of concentric lines thereon providing arcuate spaces, each space having graduations and numerals thereon indicating total values of commodities at different prices per unit, of an indicator movable across said chart and having corresponding arcuate spaces and a reading line thereon, each space on said indicator being provided with a numeral indicating price per unit value, said numerals being located at a distance from the reading line of said indicator and each space on the indicator having a line extending from the numeral thereon toward the reading line of the indicator, the outer ends of said indicator lines being arranged to point toward the corresponding graduations on the arcuate spaces of the chart.

2. In a computing scale, the combination of a chart and an indicator, the chart being provided with a plurality of arcuate spaces thereon, each space being provided with graduations and numerals indicating total values and the indicator being provided with a reading line and with similarly arranged arcuate spaces each provided with a price numeral, the price numerals being remote from the reading line of the indicator and each space having a leader extending from the numeral thereon toward the reading line of the indicator and in a direction to indicate the graduations on the chart corresponding to such numeral.

3. In a scale, the combination with a chart having concentric series of graduations thereon, of an index hand coöperating with said chart, said index hand having a transparent portion at one side thereof and an opaque portion at the opposite side thereof, the transparent side of the hand being provided with a reading line arranged to intersect the graduations of the chart and having its opaque side provided with a series of price numerals corresponding to the graduations on the chart, and a leader extending from each numeral toward the reading line on the index hand and arranged to direct the eye of the operator to the proper graduations on the chart.

4. In a scale, the combination, with a chart having concentric series of computation graduations, of an index hand coöperating with said chart, said index hand having a transparent member provided with a reading line and having a series of price numerals each corresponding to a series of graduations on the chart, and means between the reading line and each figure on the index hand for directing the line of sight to the correct graduations on the chart.

5. In a scale, the combination, with a chart having series of graduations thereon, of an index hand coöperating with said chart, said hand having a transparent member provided with a reading line arranged to intersect the graduations on the chart and also having a series of numerals remote from the reading line and corresponding each to a series of graduations on the chart, and means extending between each numeral and the reading line for preventing the reading of the wrong series of graduations on the chart.

6. In a scale, the combination of a chart having series of graduations, each series being provided with numerals indicating total values, of a transparent indicating member movable with respect to said chart, said member being provided with a series of price numerals and each corresponding to a series of graduations on the chart, the index hand being provided with a reading or value line arranged to intersect the series of graduations on the chart and with an arrow extending in an inclined direction from each numeral on the indicating member and arranged to guide the eye of the operator to the correct series of graduations.

7. In a scale, the combination, with a chart having concentric series of arcuate spaces, each having numerals and graduations indicating total values, of an index hand movable across said chart and having a reading line and a series of price numerals remote from said line and each corresponding to an arc upon the chart, there being means extending between each numeral and said line and arranged to direct the eye of the operator to the proper series of numerals on the chart.

8. An index hand for charts, said hand comprising a rigid base, and a transparent member secured to said base and projecting beyond an edge of the same and provided with a reading or value line, said member being provided with a series of numerals in front of the rigid base.

9. An index hand for computing scales comprising a rigid base member having its upper or outer end substantially U-shaped to provide a pointer and a member of transparent material carried by the rigid member and projecting beyond an edge of the latter and provided with a distinct reading or value line beyond the edge of the base member, said index hand having numerals thereon and an index extending from each numeral toward the reading or value line.

10. An index hand for charts comprising a rigid base member and a transparent member secured to the base member and projecting beyond the edge thereof and there provided with a value or reading line, the index hand being provided with a series of numerals located in front of the rigid member, and a series of index arrows extending from said numerals toward the reading or value line.

11. The combination, with a chart having on one face series of numerals and graduations and on its opposite face a series of graduations and numerals indicating weight and located near the outer edge thereof, of an index hand extending across the front face of the chart and provided with a reading or value line and a series of price numerals, the outer end of said index hand being bent around the outer edge of the chart and formed into a pointer or index coöperating with the graduations and numerals on the rear face of the chart.

12. An index hand for computing scales having an opaque portion and a transparent portion having a reading line, the opaque portion having a series of numerals thereon indicating prices per unit weight, some of said numerals being distinguished in appearance from the others.

13. In a computing scale, the combination, with a chart having a concentric series of arcuate spaces, each having numerals and graduations indicating total values, of an index movable across said chart and having an opaque portion provided with numerals indicating prices per unit weight, and a transparent portion provided with a reading line, some of the numerals on the said index hand being readily distinguished by appearance from the others.

14. In a scale, the combination of a chart having numerals and graduations thereon, an indicating member movable across said chart and having a transparent portion and an opaque portion provided with numerals, the transparent portion being provided with a reading line near an edge thereof.

15. In a computing scale, the combination of a chart member having thereon numerals indicating the values of commodities at different prices per unit weight, an indicating member having one side thereof transparent and the other side opaque and provided with numerals indicating prices per unit weight of such commodities and having the first mentioned side provided adjacent its edge with a reading line, and a support for commodities operatively connected with one of said members.

16. In a computing scale, the combination of a chart member having thereon numerals indicating the values of commodities at different prices per unit weight, an indicating member having one side thereof transparent and the other side opaque and provided with numerals indicating the prices per unit weight of such commodities, the transparent side being provided near the edge thereof with a reading line, and a support for such commodities operatively connected with one of said members, the numerals on said members being arranged so that those on one member will register with those on the other member when brought into juxtaposition.

17. In a scale, the combination of a chart having numerals and graduations thereon, and an index hand movable across said chart, said index hand comprising a base member of transparent material having adjacent one edge thereof a reading line, an opaque member adjacent the other edge of said base member and having numerals thereon, and means for securing said members together.

18. In a scale, the combination, with a load carrying member, of a pair of coiled load carrying spring members extending in opposite directions and having their proximate ends connected, the said spring members being of such length and material that one coil will contract and expand an equal linear distance with the other through changes in temperature, and means operatively connecting the load carrying member to the proximate ends of said spring members.

19. In a scale, the combination, with a load carrying member, of a pair of coiled spring members extending in opposite directions and having their proximate ends connected, the said spring members being of the same material and of the same length whereby one coil will contract and expand an equal linear distance with the other through changes in temperature, and a connection between said proximate ends of the spring members and the load carrying member.

In testimony whereof, I hereunto affix my signature in the presence of two witnesses.

HENRY S. HALLWOOD.

Witnesses:
  Q. R. LANE,
  WINIFRED LIVINGSTON.